US009422888B2

(12) United States Patent
Werquin et al.

(10) Patent No.: US 9,422,888 B2
(45) Date of Patent: Aug. 23, 2016

(54) ACTUATING DEVICE FOR MOVING A MOVABLE COVER OF A THRUST REVERSER

(71) Applicant: SAGEM DEFENSE SECURITE, Boulogne-Billancourt (FR)

(72) Inventors: Mickael Werquin, Boulogne-Billancourt (FR); David Charrier, Boulogne-Billancourt (FR); Oleg Gomolko, Boulogne-Billancourt (FR); Pascal Omnes, Boulogne-Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 0 days.

(21) Appl. No.: 14/396,379

(22) PCT Filed: Apr. 23, 2013

(86) PCT No.: PCT/EP2013/058402
§ 371 (c)(1),
(2) Date: Oct. 22, 2014

(87) PCT Pub. No.: WO2013/160308
PCT Pub. Date: Oct. 31, 2013

(65) Prior Publication Data
US 2015/0082927 A1 Mar. 26, 2015

(30) Foreign Application Priority Data
Apr. 23, 2012 (FR) ...................................... 12 53685

(51) Int. Cl.
*F02K 1/72* (2006.01)
*F02K 1/09* (2006.01)
(Continued)

(52) U.S. Cl.
CPC ................. *F02K 1/763* (2013.01); *F02K 1/09* (2013.01); *F02K 1/72* (2013.01); *F02K 1/766* (2013.01); *F16H 25/20* (2013.01); *F16H 25/2454* (2013.01); *Y10T 74/18704* (2015.01)

(58) Field of Classification Search
CPC ............ F02K 1/09; F02K 1/72; F02K 1/763; F02K 1/766; F16H 25/20; F16H 25/22; F16H 25/2454; F16H 25/2021; F16H 25/2025
See application file for complete search history.

(56) References Cited

U.S. PATENT DOCUMENTS 4,365,539 A * 12/1982 Martin ...................... F02K 1/76
92/17
4,463,661 A * 8/1984 Tootle ...................... F02K 1/76
92/17

(Continued)

FOREIGN PATENT DOCUMENTS

EP    0 087 254 A2    8/1983
EP    0 087 255 A2    8/1983

(Continued)

*Primary Examiner* — David M Fenstermacher
*Assistant Examiner* — Jude Agendia
(74) *Attorney, Agent, or Firm* — Blakely Sokoloff Taylor & Zafman LLP

(57) ABSTRACT

The invention relates to an actuating device (1) for moving a mobile cap of a thrust reverser, comprising: —an actuator comprising a first element (3), such as a screw, and a second element (4), such as a nut, collaborating with the first element in such a way that turning the first element causes the second element to move in a translational movement, —a locking piece (18) rotationally mobile between a locked position in which the locking piece prevents the first element (3) from turning, and an unlocked position in which the locking piece (18) allows the first element (3) to turn, and —an unlocking piece (25) rotationally mobile between an active position in which the unlocking piece (25) urges the locking piece (18) towards the unlocked position and a passive position in which the unlocking piece (25) allows the locking piece (18) to return to the locked position.

16 Claims, 21 Drawing Sheets

Figure 1:
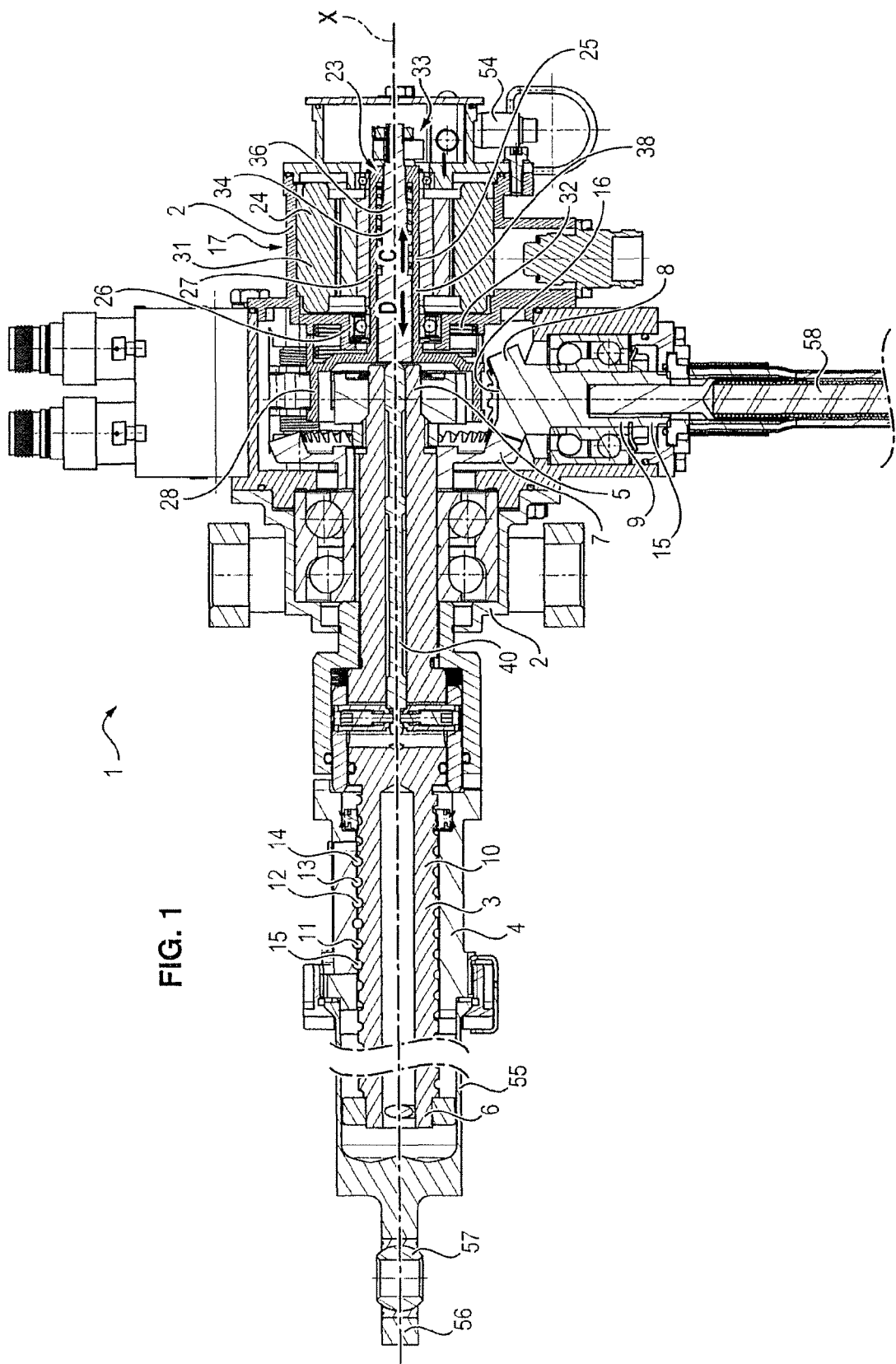

(51) Int. Cl.
*F16H 25/20* (2006.01)
*F02K 1/76* (2006.01)
*F16H 25/24* (2006.01)

(56) References Cited

U.S. PATENT DOCUMENTS

| | | | | |
|---|---|---|---|---|
| 4,714,006 | A * | 12/1987 | Tootle | B64C 13/00 74/105 |
| 6,786,039 | B2 * | 9/2004 | Chakkera | F02K 1/766 239/265.29 |
| 6,935,097 | B2 * | 8/2005 | Eschborn | B64D 33/04 239/265.19 |
| 8,042,417 | B2 * | 10/2011 | Davies | F02K 1/763 74/89.37 |
| 8,715,132 | B2 * | 5/2014 | Kopecek | F02K 1/763 475/329 |
| 8,932,176 | B2 * | 1/2015 | Kopecek | 475/329 |
| 2004/0206066 | A1 | 10/2004 | Eschborn | |
| 2007/0220998 | A1 * | 9/2007 | Kopecek | B64C 13/28 74/89.39 |

FOREIGN PATENT DOCUMENTS

| | | |
|---|---|---|
| EP | 0 090 540 A2 | 10/1983 |
| EP | 0 102 684 A1 | 3/1984 |
| EP | 0 536 954 A1 | 4/1993 |
| EP | 1 052 428 A2 | 11/2000 |
| EP | 1 980 770 A2 | 10/2008 |
| FR | 2 960 917 A1 | 12/2011 |

* cited by examiner

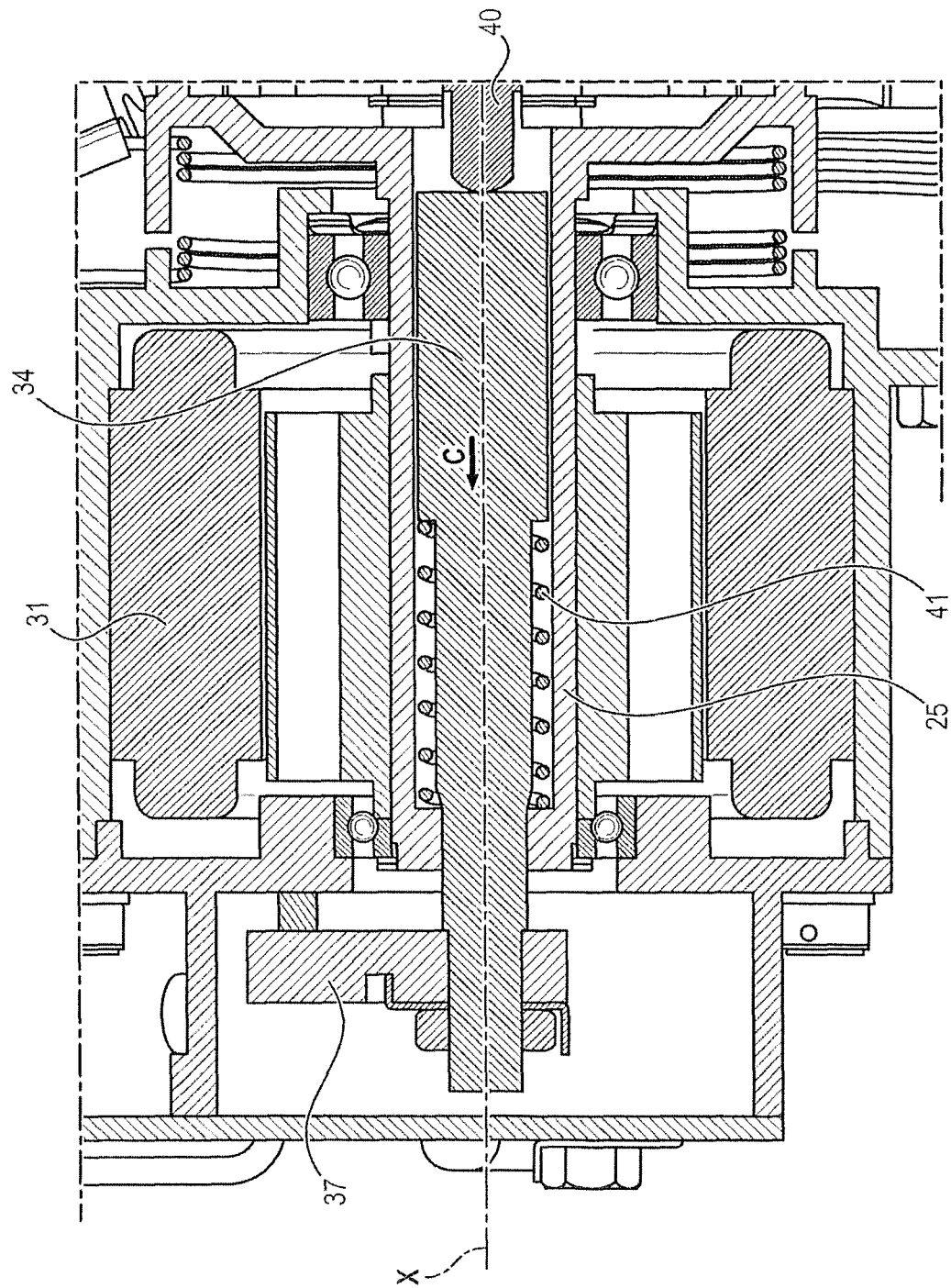

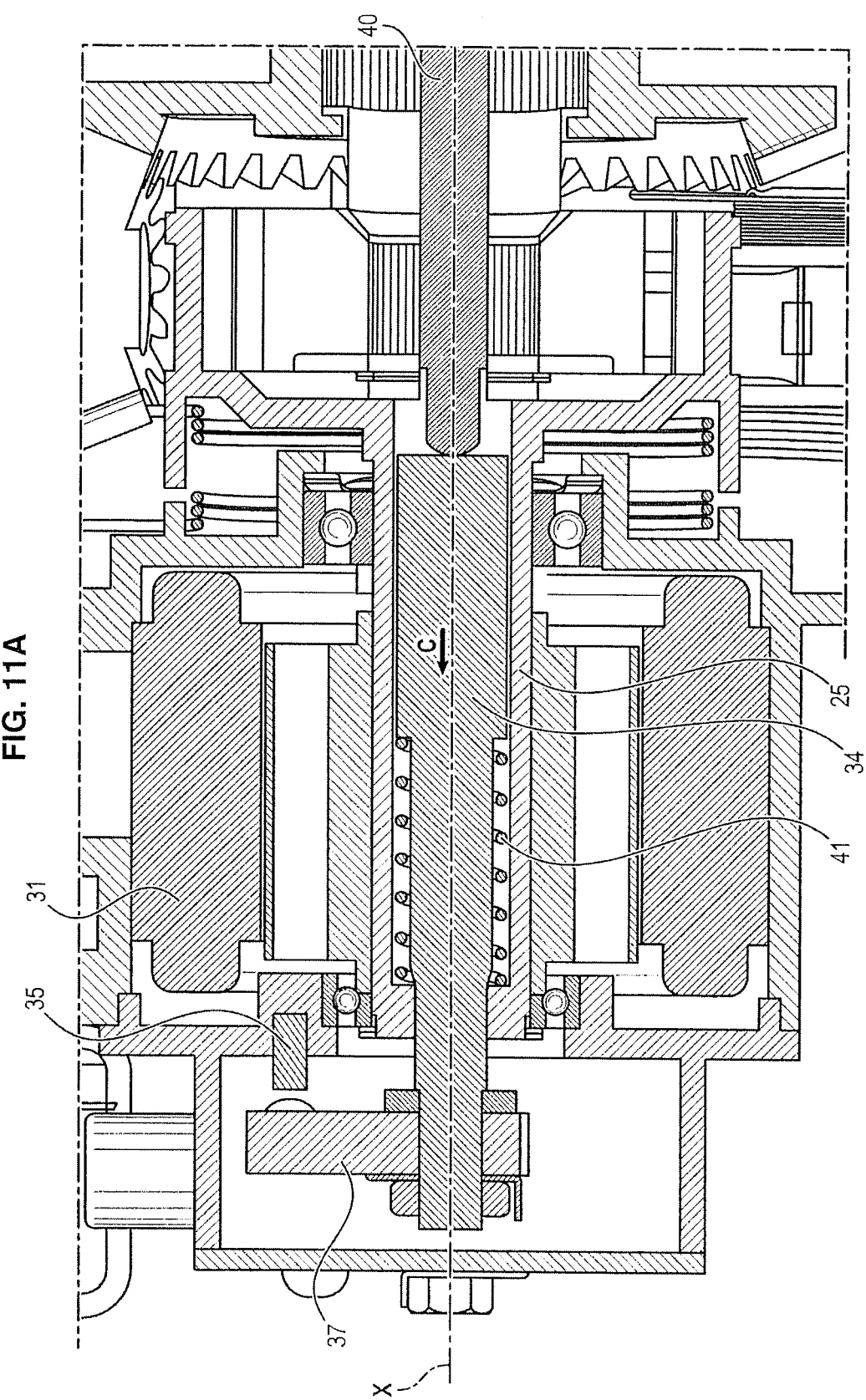

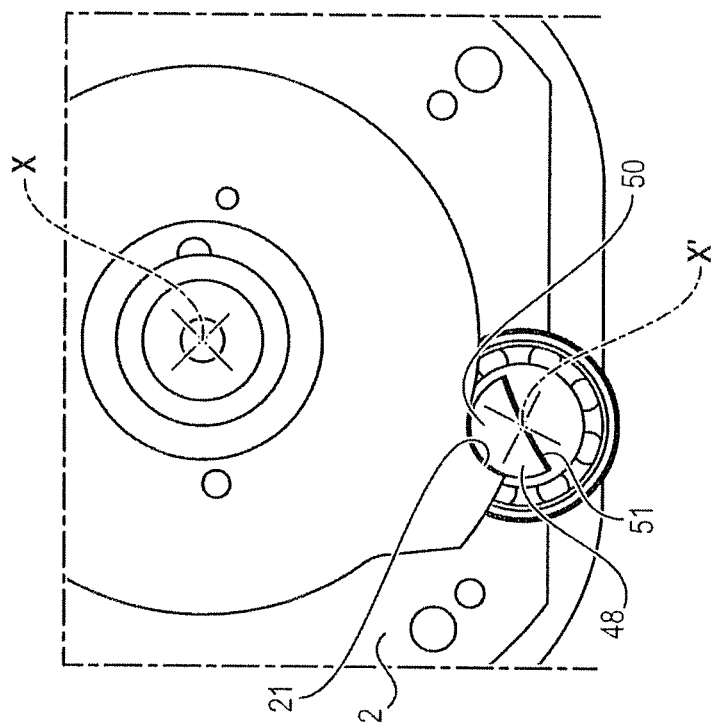
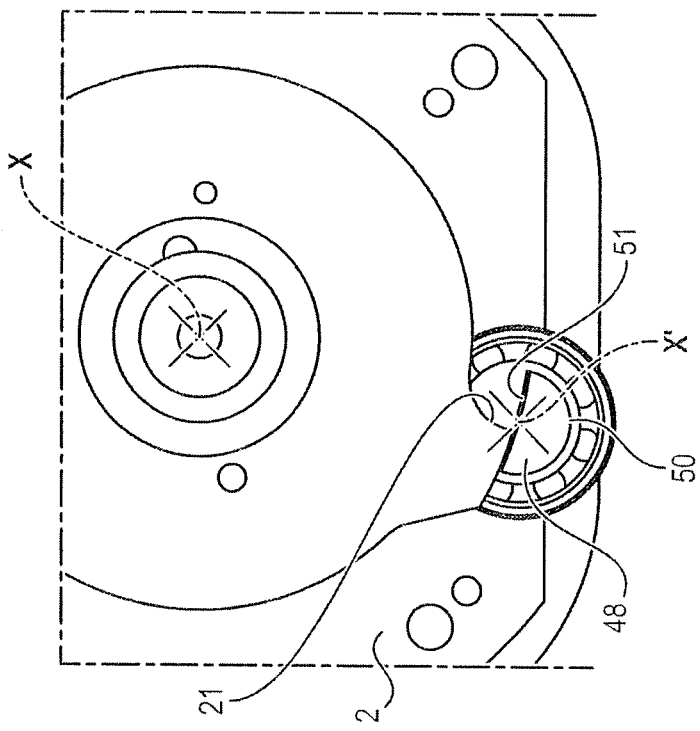

ACTUATING DEVICE FOR MOVING A MOVABLE COVER OF A THRUST REVERSER

FIELD OF THE INVENTION

The invention relates to an actuating device for moving a movable cover of a thrust reverser.

PRIOR ART

Propulsion units or PPS (power plant systems) of airplanes generally include a nacelle and a turbojet engine attached to a wing pylon or to an airplane fuselage. In the case of a high bypass ratio dual flow turbojet (turbofan), the turbojet includes a gas generator (high-pressure unit), a low-pressure unit, a fan and nozzles. The fan makes it possible to accelerate a secondary air flow circulating in a stream tube of the fan, to generate the thrust needed for propelling the airplane.

The propulsion units of airplanes generally include a thrust reverser system or TR allowing thrust to be reversed during landing phases so as to improve the braking capacity of the airplane. Such a system includes a set of moveable covers actuated by a system of associated actuators, or TR, making it possible to temporarily obstruct the stream tube and to deflect the secondary airflow outward and toward the front of the nacelle, thus generating a counter-thrust that supplements the braking effect of the wheels.

In the case of a so-called "door type" thrust reverser system, the nacelle is equipped with movable covers (called "doors") which pivot with respect to the structure of the nacelle between a retracted position wherein they allow circulation of the secondary flow in the stream tube toward the nozzle and a deployed position wherein the flaps obstruct the stream tube and reorient the air flow outward and toward the front of the nacelle.

In the case of a so-called "grating" or "cascade type" thrust reverser system, the nacelle is equipped with moveable covers which slide with respect to the structure of the nacelle, along rails, between a retracted position wherein the allow circulation of the secondary flow in the stream tube and toward the nozzle and a deployed position wherein they uncover deflector vane gratings positioned within the thickness of the nacelle and obstruct the stream tube by means of flaps, the actuation whereof is linked to the motion of the covers.

Generally, in either case, the movable covers are actuated by a set of dedicated actuators. Mechanical synchronization of the motion of the actuators is provided by a synchronization system including flexible shafts allowing the actuators to be mechanically interconnected.

In addition, the thrust reverser systems must include several locking devices making it possible to prevent unwanted deployment of the covers during the flight phase. Among the locking devices equipping thrust reverser systems, certain locking systems called "primary" or PLS (primary lock system) operate on the flexible shaft to lock the flexible shaft in rotation.

Document U.S. Pat. No. 6,786,039 describes an actuating system for a thrust reverser including an actuator driven in motion between a retracted configuration and a deployed configuration by means of a drive shaft connected to a flexible shaft. The system includes a locking device which can be controlled so as to engage or disengage the drive shaft so as to prevent or allow rotation of the drive shaft. The system also includes a lock inhibitor making it possible to hold the locking device in the disengaged position as long as the actuator is not in a retracted configuration.

The locking device includes a locking rod movable in translation, a spring to drive the rod toward its engaged position and an electromagnet which can be activated to drive the rod toward the disengaged position.

Such a locking device must be designed to operation under high dynamic loads and despite shocks which can occur during flight and ground handling phases. In particular, the device must operate in the event of loss of an engine fan blade (fan blade out) which can generate accelerations reaching 200 G. The locking device must also be insensitive to other excitation sources (unbalance, rolling shocks, etc.).

That is why, in the locking devices, it is generally necessary to provide a spring exhibiting high stiffness in order to ensure that the locking rod is not disengaged in the event of a shock. This has the consequence that it is also necessary to provide a solenoid capable of generating a high unlocking force in order to overcome the force exerted by the spring and to disengage the locking rod.

It follows that the locking device necessarily exhibits a large volume due to the considerable dimensions of the spring and the electromagnet which are provided to prevent untimely unlocking.

SUMMARY OF THE INVENTION

One goal of the invention is to propose an actuating device which exhibits reduced volume.

This problem is solved within the scope of the present invention thanks to an actuating device, for moving a moveable cover of a thrust reverser, comprising:
  an actuator including a first element, and a second element mounted so as to be movable in translation with respect to the first element, one of the first or the second element being a screw, so that rotation of the first element relative to the second element drives translation of the second element relative to the first element,
  a locking device including a locking piece movable in rotation between a locked position wherein the locking piece prevents rotation of the first element and an unlocked position wherein the locking piece allows rotation of the first element, and
  an unlocking device including an unlocking piece movable in rotation between an active position wherein the unlocking piece urges the locking piece toward the unlocked position and a passive position wherein the unlocking piece allows a return of the locking piece into the locked position, and a drive member capable of driving in rotation the unlocking piece so that the unlocking piece moves the locking piece into the unlocked position.

As the locking piece and the unlocking piece are movable in rotation (and not in translation), the unlocking device can be designed such that the locking piece and the unlocking piece are very insensitive to the abrupt accelerations that can be exerted on the actuating device in the event of a shock. In particular, the unlocking device can be designed so that the unlocking piece is movable in rotation about an axis of rotation running through the center of gravity of the unlocking piece.

It is thus possible to design a device incorporating a return member with reduced mass and dimensions, as well as a drive member of reduced dimensions and mass.

The device can further exhibit the following features:
  the locking device includes a tooth mounted so as to rotate together with the first element, the locking piece being capable, in the locked position, to come into engagement with the tooth to prevent rotation of the first element, the locking piece includes a pawl capable of coming into engagement with the tooth in the locked position, the locking device includes a roller carried by the unlocking device, capable of holding the pawl in engagement with the tooth when the pawl is in the locked position, the unlocking device comprises a pin which, when the unlocking piece is driven in rotation, urges the pawl to cause the pawl to pivot into the unlocked position, the unlocking device comprises a latch having a convex portion and a concave portion capable of being selectively positioned facing the tooth, the convex portion being capable of interfering with the tooth when the convex portion is facing the tooth to prevent rotation of the first element and the convex portion being capable of allowing rotation of the first element when the concave portion is facing the tooth, the tooth is asymmetrical so that in the locked position, the locking piece prevents rotation of the first element in a first direction and allows rotation of the first element in a second direction opposite to the first direction, the locking piece is capable of meshing with the unlocking piece so that the rotation of the unlocking piece controls the rotation of the locking piece, the drive member comprises a rotary electromagnet, the unlocking device includes a return spring capable of urging the unlocking piece into the passive position, the unlocking device includes a stop and a retainer rotationally fixed to the unlocking piece and movable in translation relative to the unlocking piece between a retaining position wherein rotation of the retainer is limited by the stop and a release position wherein the retainer is free in rotation, the actuating device includes a return member adapted for urging the retainer toward the retaining position, the actuating device comprises a rod movable in translation relative to the first element and capable of being urged by the second element to move the retainer into the release position, the mobile rod extends at least partially inside the first element, the actuating device also comprises a manual unlocking device for urging the retainer in rotation so as to bring the unlocking piece into the active position, without activating the drive member, the first element is the screw and the second element is the nut.

PRESENTATION OF THE DRAWINGS

Figure 2:
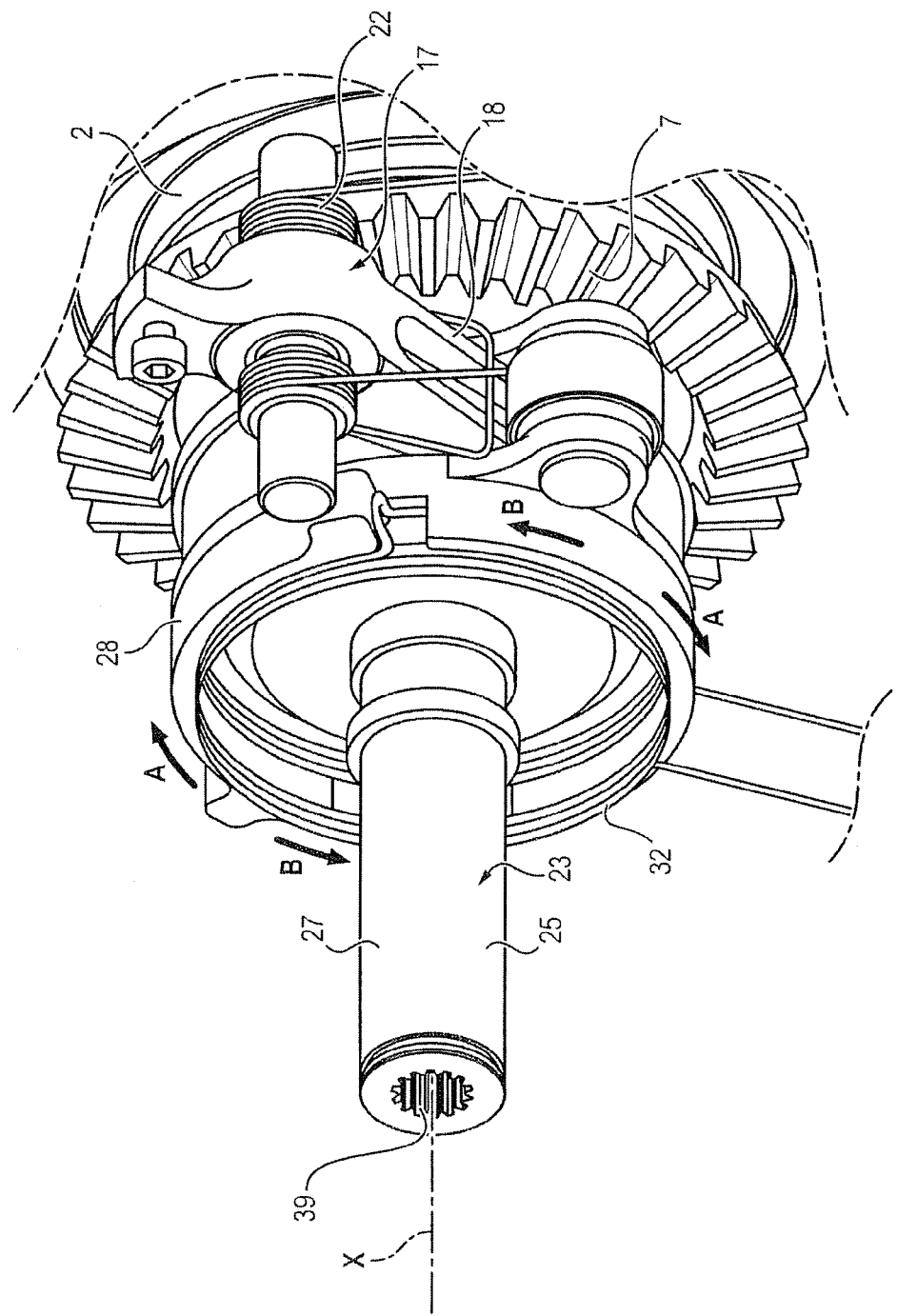
Figure 3:
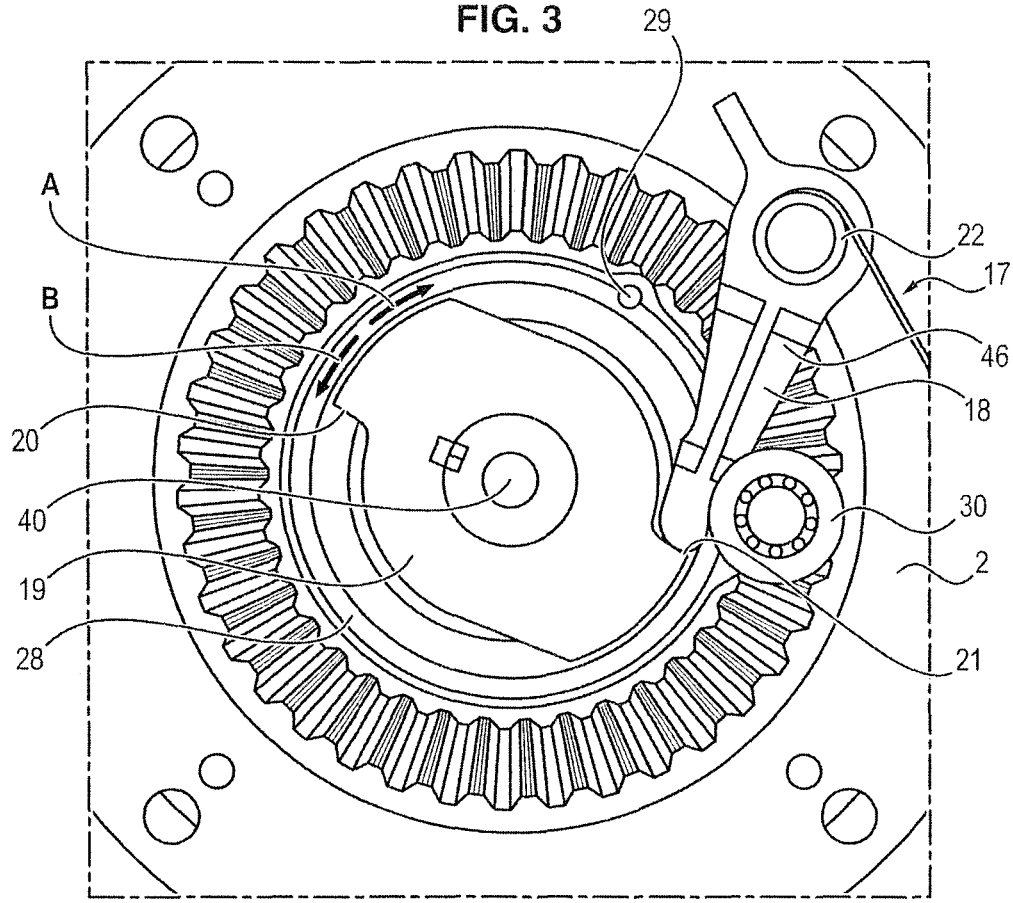
Figure 4:
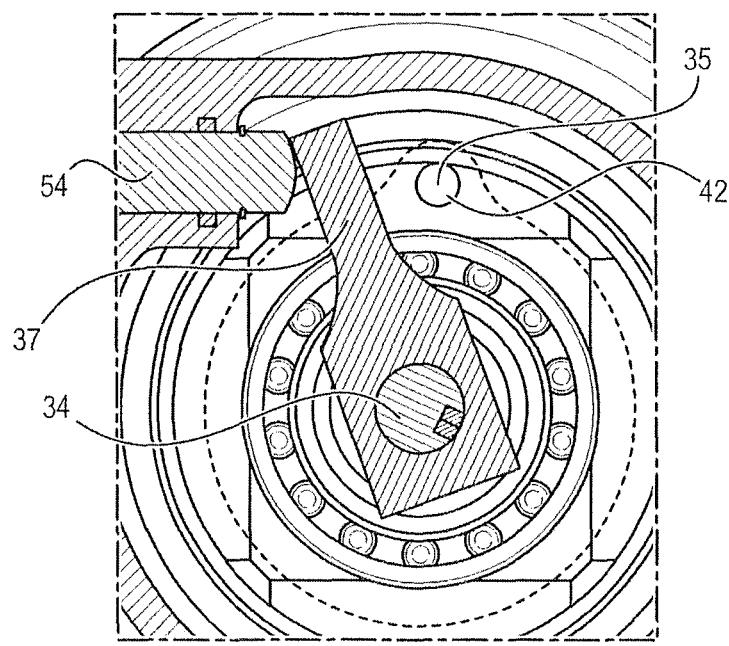
Figure 5:
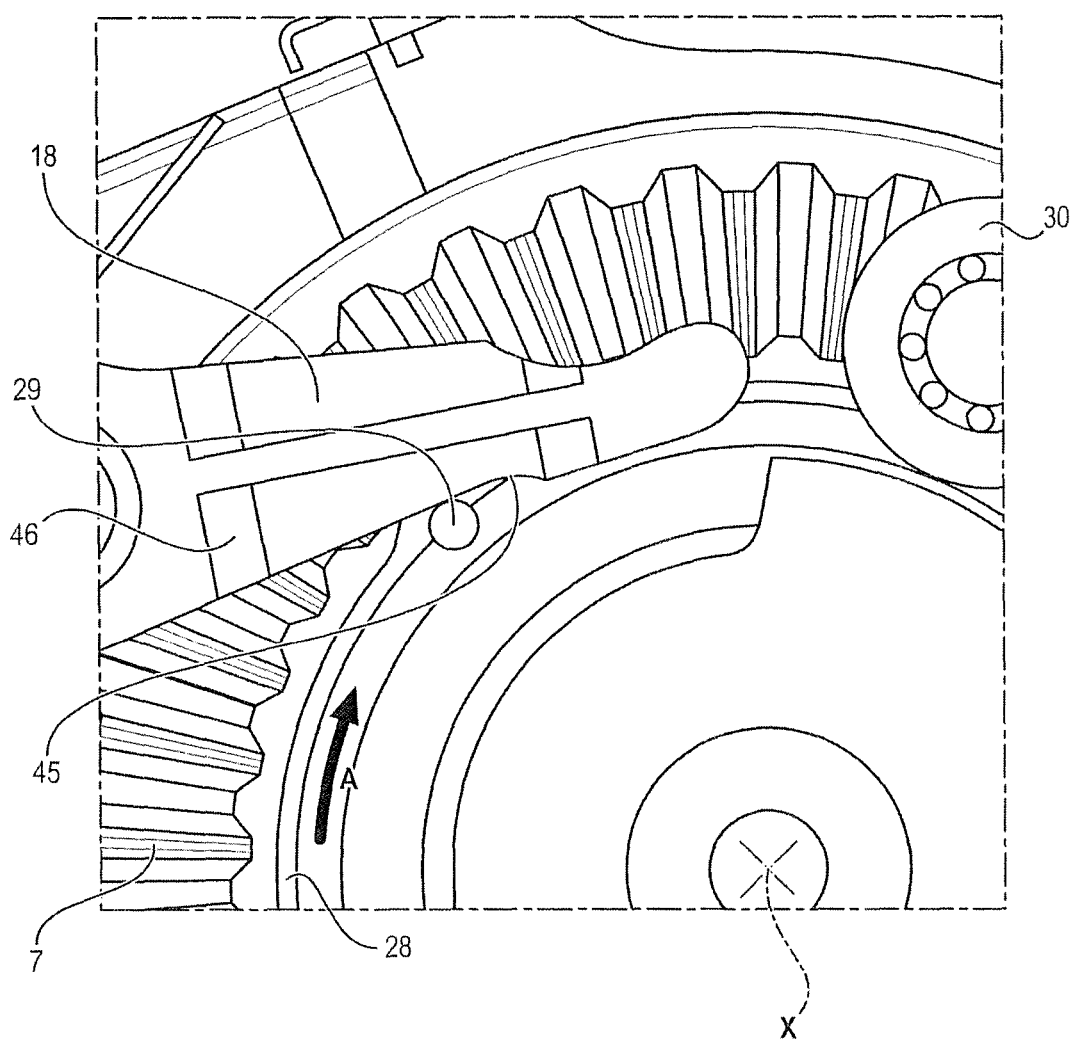
Figure 13:
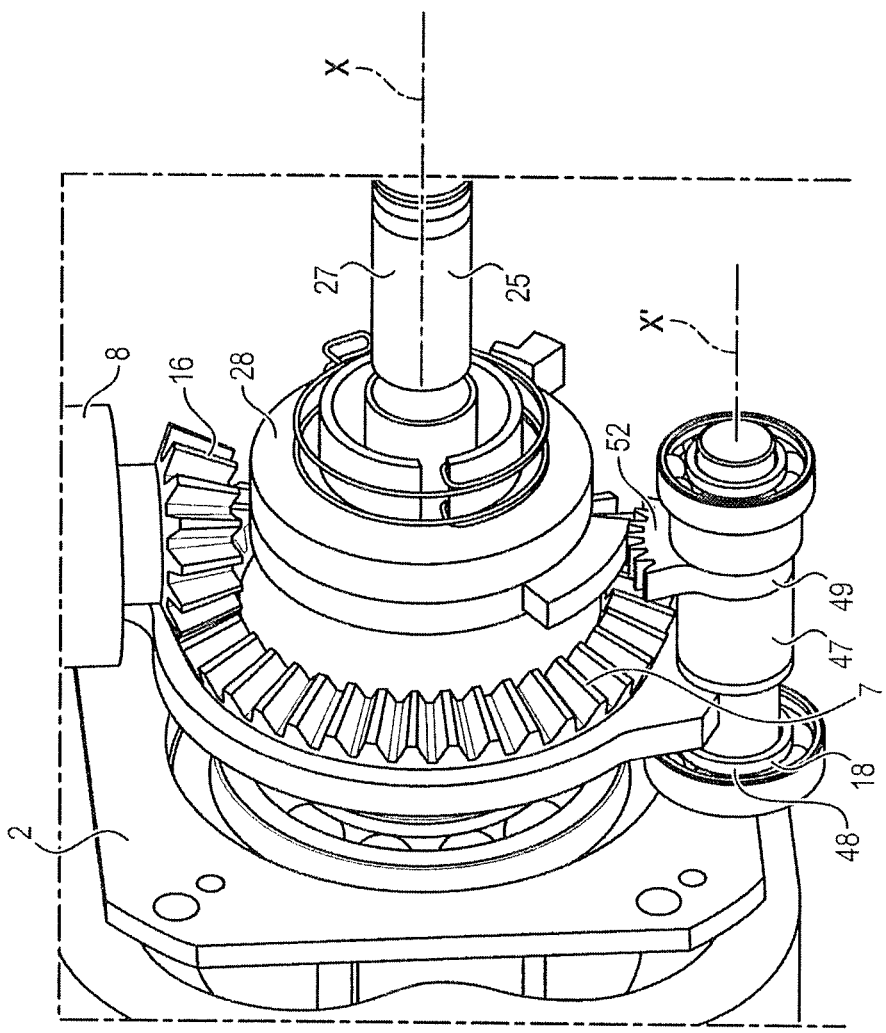
Figure 15A:
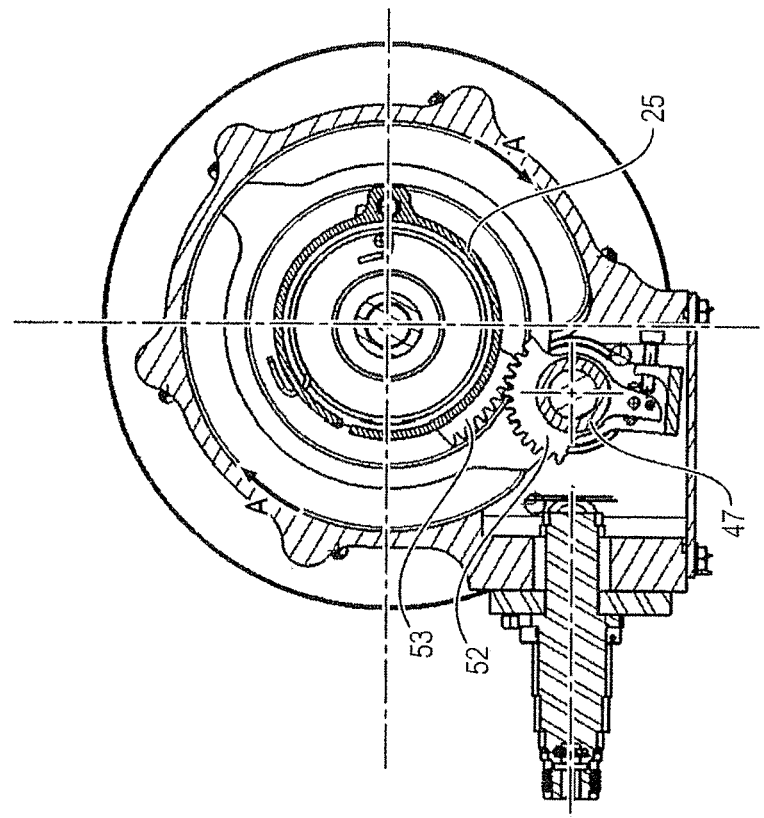
Figure 15B:
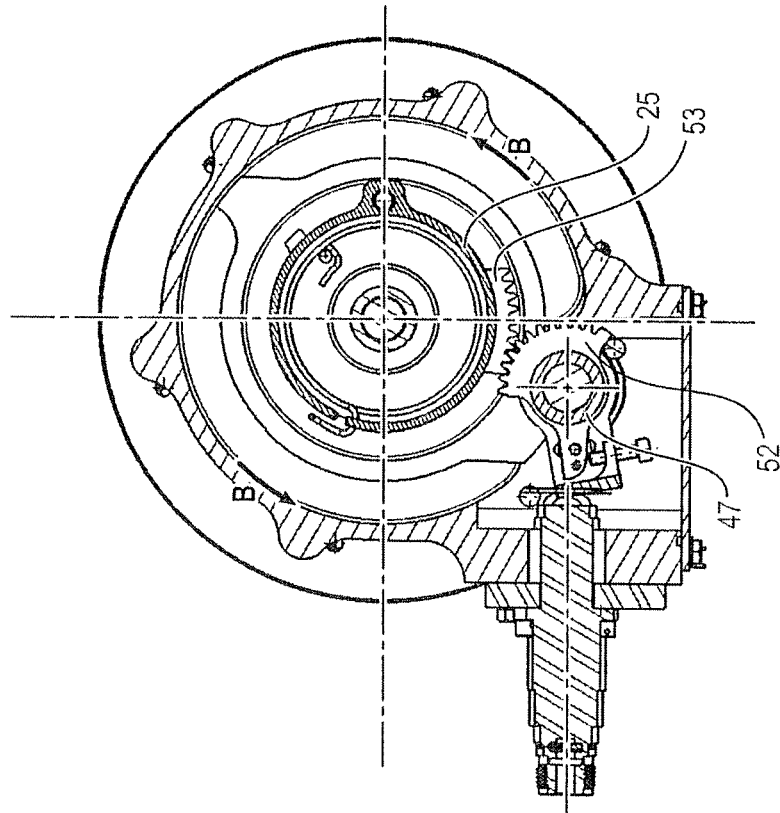

Still more features and advantages will appear from the description that follows, which is purely illustrative and not limiting, and must be read with reference to the appended figures of which:

FIG. 1 shows schematically, in longitudinal section, a device conforming to a first embodiment of the invention, FIG. 2 shows schematically, in perspective, a portion of the device of FIG. 1, FIG. 3 shows schematically, in rear view, the locking device of the device of FIG. 1, FIG. 4 shows schematically, in rear view, the unlocking device of the device of FIG. 1, FIG. 5 is a detail view showing schematically the shape of a locking piece, FIGS. 6A to 12C show schematically steps in the operation of the device conforming to the first embodiment, FIG. 13 shows schematically, in perspective, a portion of the actuating device conforming to a second embodiment of the invention, FIGS. 14A and 14B shows schematically in rear view the locking device of the device of FIG. 1, respectively in the unlocked and in the locked position, FIGS. 15A and 15B show schematically in cross section the unlocking device of the device of FIG. 1, respectively in the active and in the passive position.

DETAILED DESCRIPTION OF AN EMBODIMENT

In FIG. 1, the device 1 shown includes a housing 2, a screw 3 extending from the housing 2 and a nut 4.

The screw 3 has a body 10 with a generally cylindrical shape and is mounted in rotation relative to the housing 2 of the device about a rotation axis X corresponding to the longitudinal axis of the screw 3 and also corresponding to a deployment axis of the actuator.

The screw 3 includes a first end 5 (or input end), designed to receive a driving torque, and a second end 6 (or free end) extending some distance from the first end 5. The actuator 1 includes a conical input wheel 7 mounted in a fixed manner with the screw 3, at the first end 5 of the screw. The conical input wheel 7 meshes with a meshing portion 8 of a drive shaft 9, so as to transmit a rotary motion of the drive shaft 9 to the screw 3.

The nut 4 extends around the body 10 of the screw 3 and is designed to be fixed to an actuator tube 55 having an end 56 connected to a mobile component of the thrust reverser (a movable cover for example) through a ball joint connection 57 with anti-rotation stops.

The nut 4 is mounted movable in translation relative to the screw 3 along the longitudinal axis X of the screw 3 to move the actuator tube between two extreme positions corresponding respectively to a retracted configuration and a deployed configuration of the actuator.

The body 10 of the screw has a cylindrical outer surface 11 wherein is formed a helical groove 12. The nut 4 has an inner cylindrical surface 13 wherein is formed a helical groove 14. The screw 3 and the nut 4 cooperate through the helical grooves 12 and 14 wherein are accommodated balls 15 such that rotation of the screw 3 relative to the housing 2 brings about translation of the nut 4 relative to the screw 3 in the X direction.

The device 1 also includes a drive shaft 9 having a first end 15 and a second end 16. The first end 15 is shaped so as to be connected to a first motor shaft of a thrust reverser or flexible shaft 58, the first motor shaft being connected to a drive motor positioned remotely from the actuating device. The second end 16 includes a conical wheel 8 arranged to mesh with the conical input wheel 7 of the screw 3 so as to drive the screw 3 in rotation.

When the motor is activated, rotation of the screw 3 concomitantly drives translation of the nut 4 between a first extreme position (corresponding to a retracted position of the device) wherein the mobile component of the thrust reverser is retracted, and a second extreme position (corresponding to a deployed position of the device) wherein the mobile component of the thrust reverser is deployed, thus making it possible to deflect the air flow toward the front of the nacelle.

The device 1 also includes a locking device 17 visible in FIG. 3 for locking the screw 3 in rotation when the actuator is in the retracted configuration, and thus avoiding unwanted deployment of the actuator, particularly in the flight phase.

The locking device 17 includes a first locking piece 18 in the form of a pawl 46 mounted in rotation relative to the housing 2, and a second locking piece 19 having two teeth 20 and 21, the second locking piece 19 being mounted in a fixed manner to the screw 3. The pawl 46 is movable in rotation between a locked position (illustrated in FIG. 3) wherein the pawl 46 comes into engagement with one of the teeth 21, thus preventing rotation of the screw 3, and an unlocked position (illustrated for example in FIG. 7) wherein the pawl 46 is separated from the tooth 21, thus allowing rotation of the screw 3.

The locking device 17 also includes a return spring 22 (such as a torsion spring) capable of driving the pawl 46 in rotation into the locked position to hold the pawl 46 in engagement with the tooth 21.

Moreover, the device 1 includes an unlocking device 23 including a drive member 24 and an unlocking piece 25.

The unlocking piece 25 is mounted in rotation relative to the housing 2 through a ball bearing 26 mounted between the housing 2 and the unlocking piece 25. The unlocking piece 25 is movable in rotation relative to the housing 2 about an axis of rotation which is the axis of rotation X of the screw 3, between an active position wherein the unlocking piece 25 drives the locking piece 18 into the unlocked position and a passive position wherein the unlocking piece 25 allows return of the locking piece 18 into the locked position.

The unlocking piece 25 has a first small-diameter cylindrical portion 27 and a second large-diameter cylindrical portion 28.

The unlocking piece 25 also includes a pin 29 visible in FIG. 3, positioned on the edge of the large-diameter cylindrical portion 28. The pin 29 is capable of driving the pawl 46 by causing it to pivot into the unlocked position when the unlocking piece 25 is driven in rotation in a first direction (shown in FIG. 2 by arrow A).

Moreover, the unlocking piece 25 includes a roller 30 carried by the unlocking piece 25, also positioned on the edge of the large-diameter portion 28. The roller 30 is capable of pressing the pawl 46 to hold the pawl 46 in engagement with the tooth 21 when the pawl 46 is in the locked position and the unlocking piece 25 is in the passive position.

The drive member 24 includes an electromagnet 31 positioned around the small-diameter portion 27 of the unlocking piece 25. When it is activated, the electromagnet 31 drives in rotation the unlocking piece 25 in a first direction of rotation (arrow A) into the active position in order to unlock the pawl 46.

The unlocking device 23 further includes a return spring 32 capable of driving the unlocking piece 25 in another rotation direction (shown by arrow B), opposite to the first rotation direction into the passive position, so as to return the pawl 46 to the locked position when the electromagnet 24 is not activated.

Moreover, the actuating device 1 includes a retaining device 33 allowing the pawl 46 to be held in the unlocked position as long as the actuator is not in the retracted configuration, even when the electromagnet 24 is not activated.

The retaining device 33 includes a retainer piece 34 and a stop 35 capable of cooperating with the retainer piece 34 to selectively prevent or allow rotation of the unlocking piece 25.

The retainer piece 34 includes a pusher 36 extending inside the unlocking piece 25 in the X direction, and a retaining finger 37 fixed to one end of the pusher 36 and extending in a radial direction relative to the pusher 36. More precisely, the pusher 36 extends inside the small-diameter portion 27 of the unlocking piece 25. The pusher 36 is mounted in a rotationally fixed manner to the unlocking piece 25, but is mobile in translation relative to the unlocking piece 25, in the X direction. To this end, the outer surface 38 of the pusher 36 and the inner surface 39 of the unlocking piece 25 are equipped with longitudinal grooves, the grooves of the rod 38 being capable of cooperating with the grooves of the unlocking piece 25 to allow translation of the rod 38 relative to the unlocking piece 25 while still preventing rotation of the pusher 36 relative to the unlocking piece 25.

The retainer 34 is movable in translation relative to the unlocking piece 25 between a retaining position (illustrated for example in FIG. 12A) wherein rotation of the retainer 34 is limited by the stop 35, and a release position (illustrated for example in FIG. 1) wherein the retainer 34 is out of reach of the stop 35 and is consequently free in rotation.

The actuating device 1 also includes a rod 40 movable in translation relative to the screw 3, the mobile rod 40 extending at least partially inside the screw 3. The mobile rod 40 is capable of being driven in translation by the nut 4 when the nut 4 reaches the first extreme position corresponding to the retracted configuration of the device 1.

The retainer 34 is capable of being driven by the mobile rod 40 to move the retainer 34 in a first direction (shown by arrow C in FIG. 1) into the release position.

Moreover, the retaining device 33 includes a return spring 41 capable of driving the retainer 34 in a second direction (shown by arrow D), opposite to the first direction, to return the retainer 34 to the retaining position when the mobile rod 40 is no longer driving the retainer 34.

The stop 35 is fixed to the housing 2 and includes a pin 42 protruding from the housing 2 in a direction substantially parallel to the X direction. The pin 42 is capable of cooperating with the finger 37 to prevent rotation of the retainer 34 (and consequently of the unlocking piece 25) relative to the housing 2. More precisely, when the retainer 34 is in the retaining position, the finger 37 comes into radial abutment against the pin 42 under the influence of the return spring 32, the pin 42 preventing rotation of the retainer 34.

As can be seen in FIG. 4, the actuating device 1 also includes a manual unlocking device 54 for driving the retainer 34 in rotation, so as to bring the unlocking piece into the active position, in the case of assembly or maintenance operations on the actuating device. More precisely, the manual unlocking device 54 includes a pusher which can be moved manually to drive the finger 37 to cause the retainer 34, and consequently the unlocking piece 25, to pivot into the active position.

FIG. 5 is a detail view showing schematically the shape of the pawl 46.

As illustrated in FIG. 5, the pawl 46 exhibits a second hollow portion 45 capable of coming into contact with the unlocking pin 29 when the unlocking piece 25 drives the pawl 46 into the unlocked position. The shape of the second hollow portion 45 makes it possible to reduce the friction force due to the pawl 46 resting on the pin 29 at the end of the unlocking process and during retention of the pawl 46 in the unlocked position.

FIGS. 7A to 12C show schematically some operating steps of the actuating device 1.

The actuating device is initially in the retracted configuration (FIG. 6A), the nut 4 being in its first extreme position.

Figure 6A:
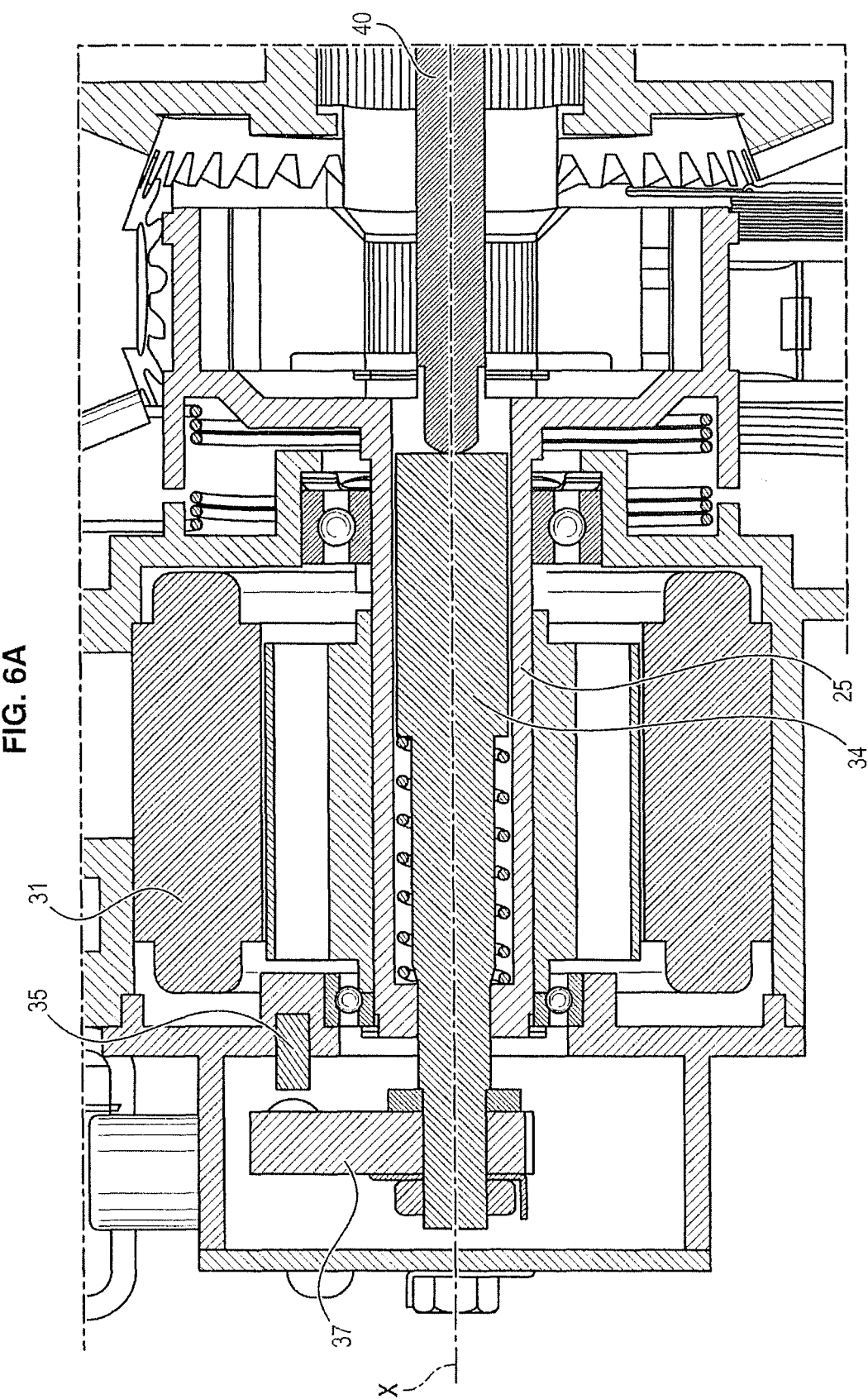
Figure 6B:
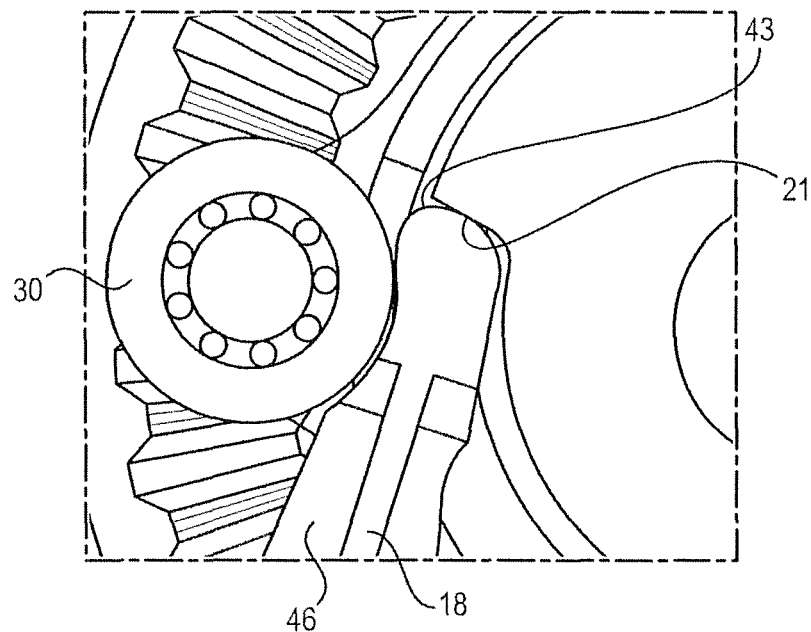

As shown in FIG. 6B, the pawl 46 is in the locked position. The free end 43 of the pawl is in abutment against the tooth 21, which prevents any rotation of the screw 3. Moreover, the roller 30 retains the pawl 46 in the locked position. In this configuration, deployment of the actuating device 1 is not possible.

Figure 6C:
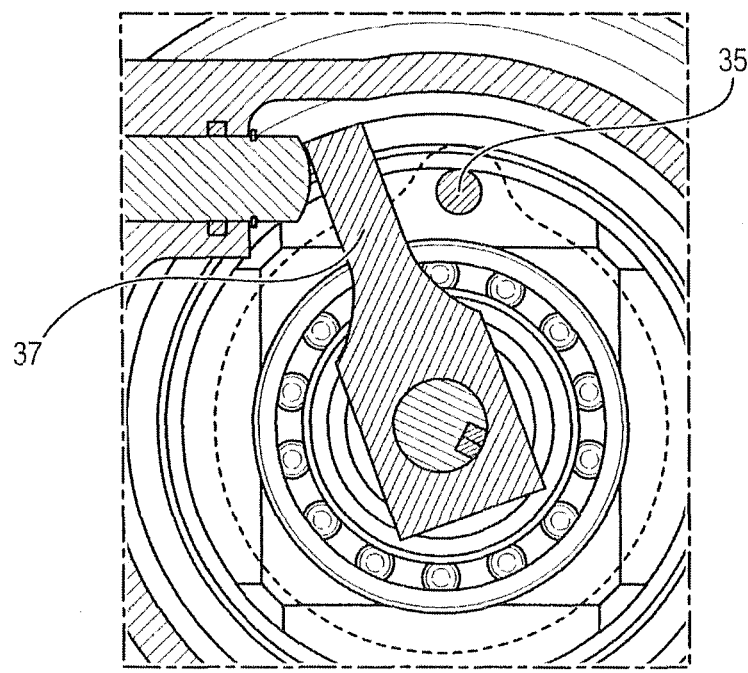

Moreover, as illustrated in FIGS. 6A and 6C, the retainer 34 is in the release position, the finger 37 of the retainer being out of reach of the stop 35.

Figure 7A:
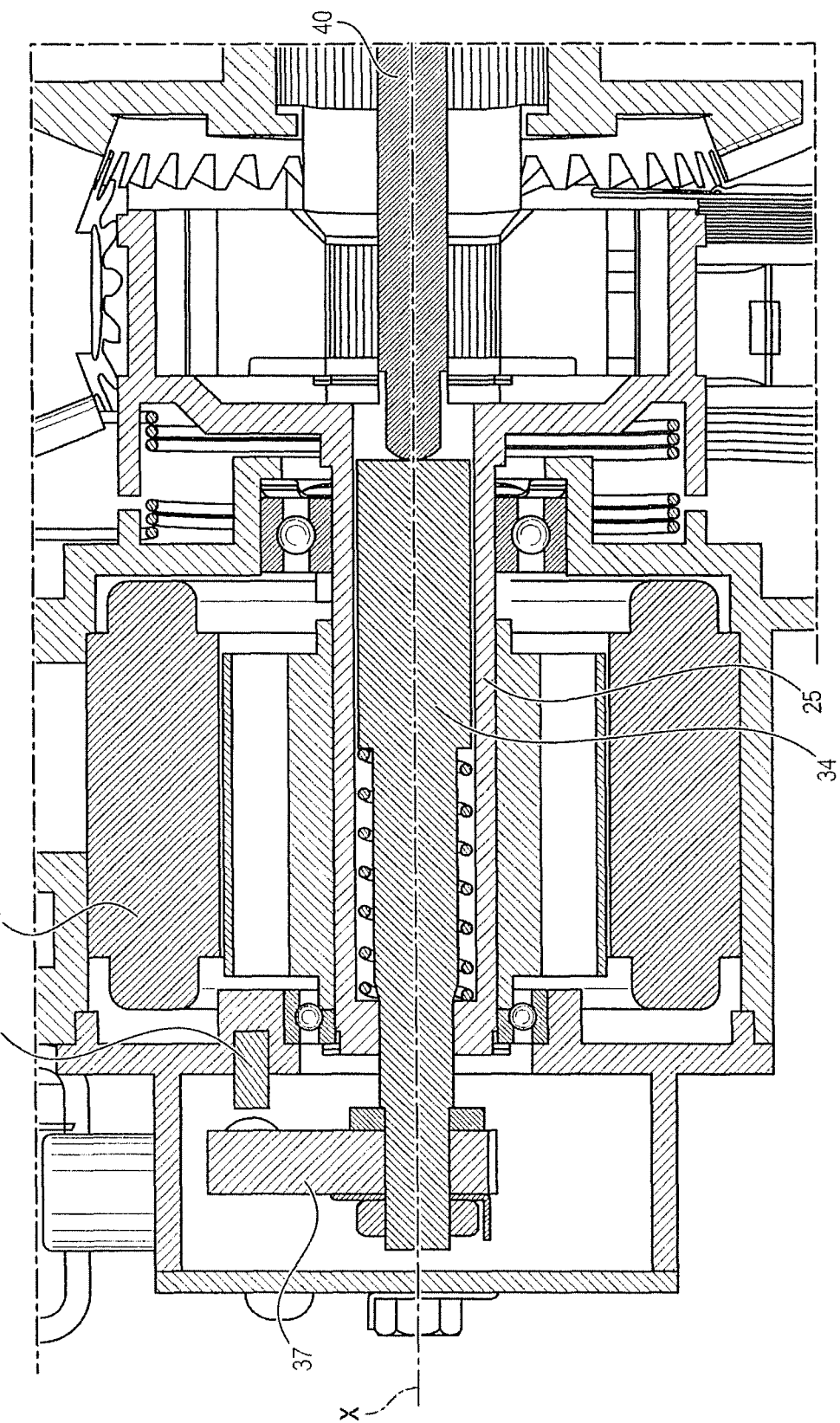
Figure 7B:
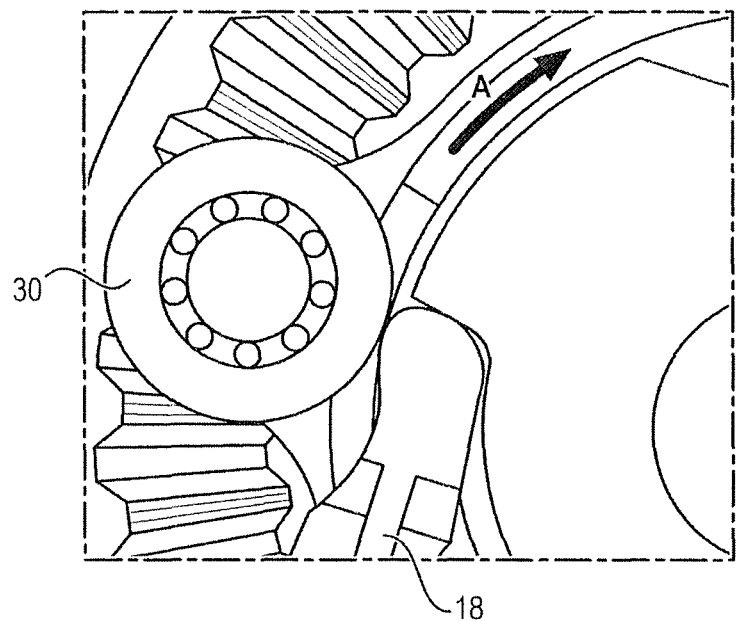
Figure 7C:
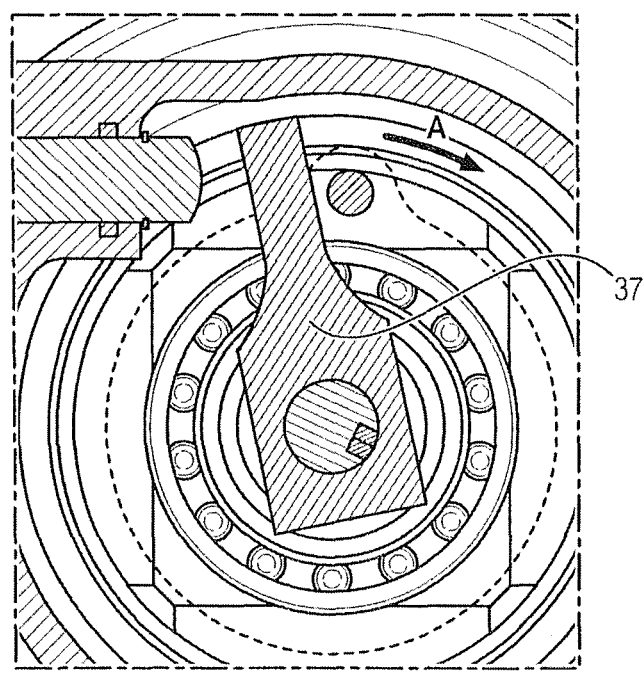
Figure 8A:
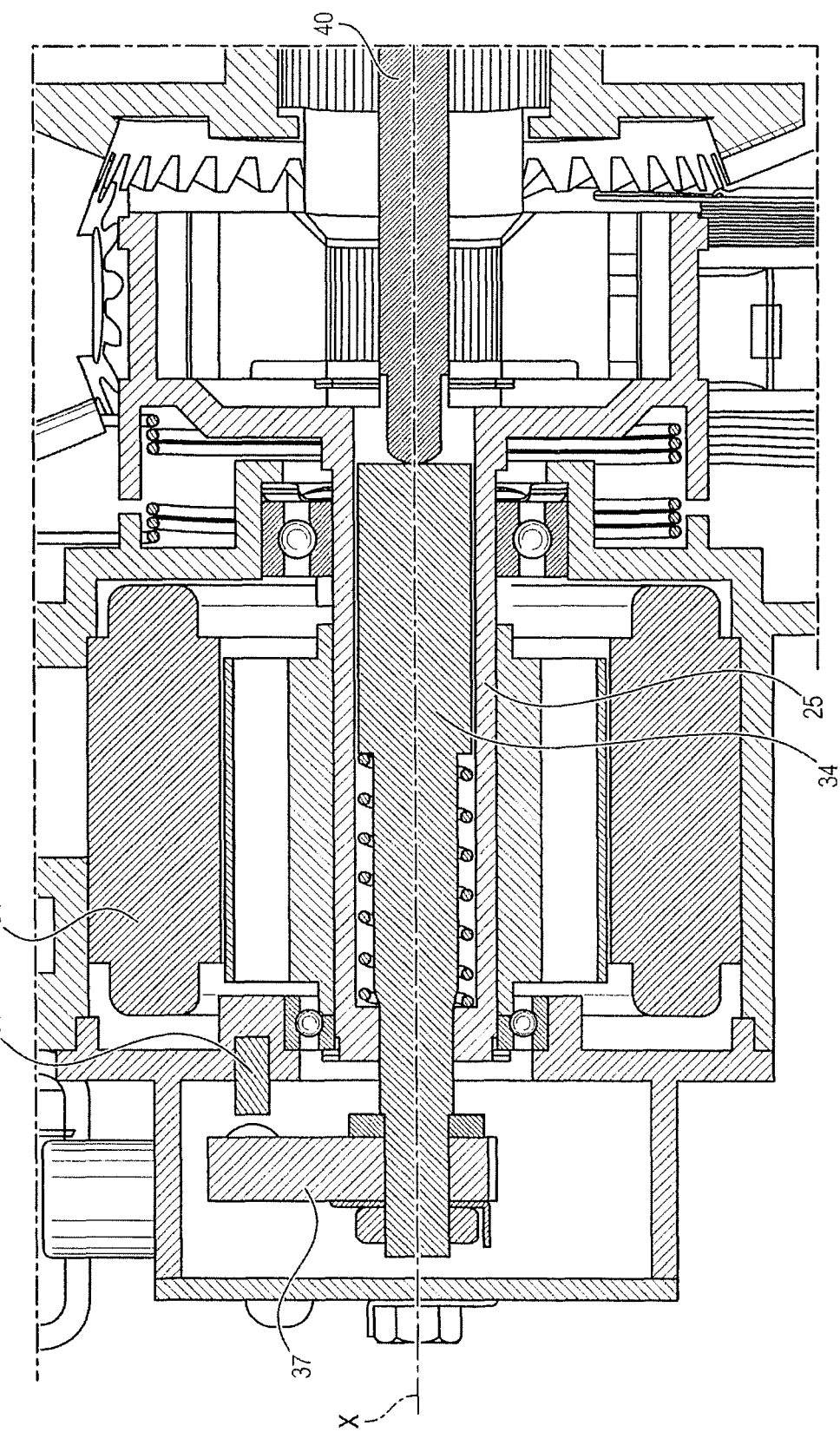
Figure 8B:
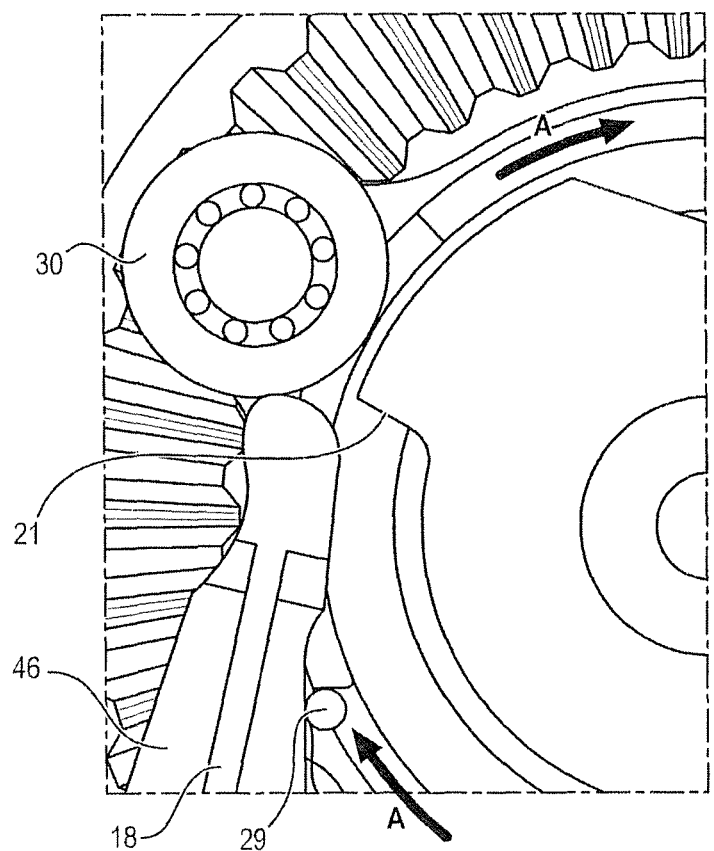
Figure 8C:
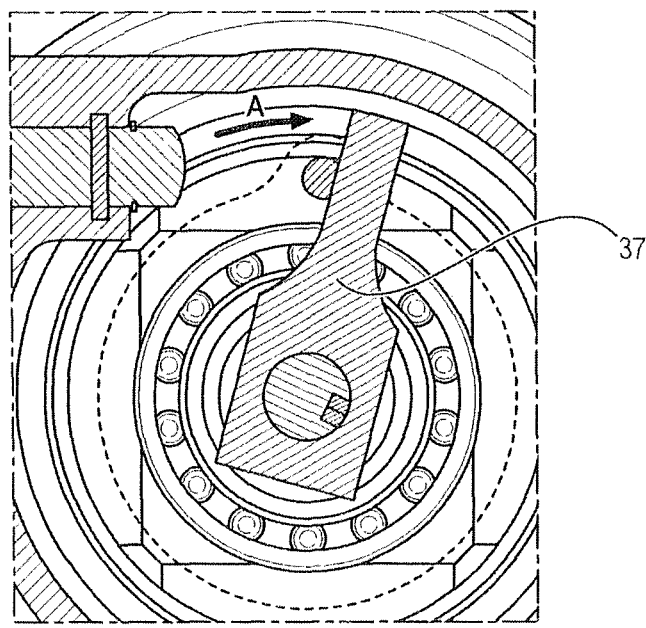
Figure 9A:
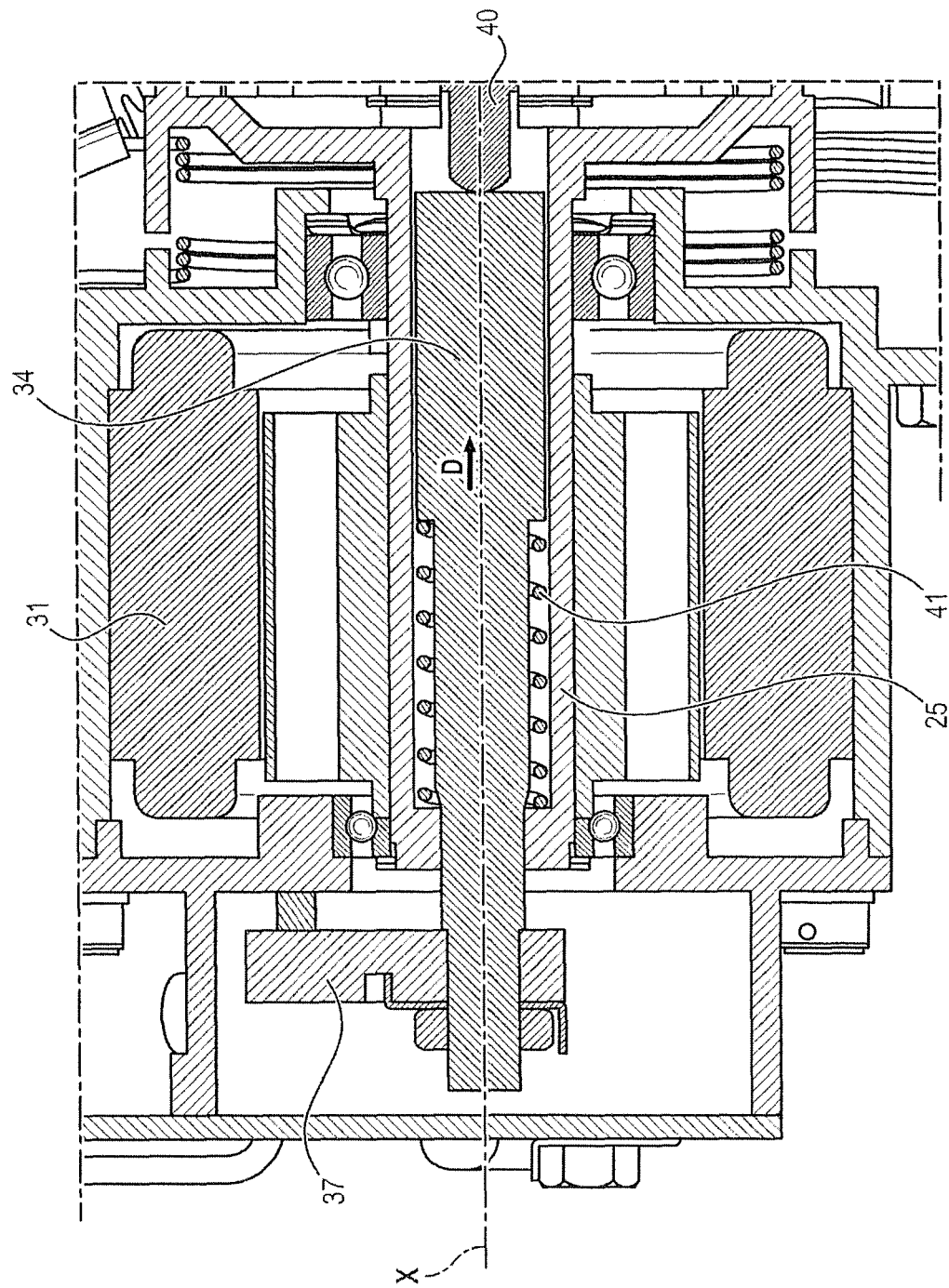
Figure 9B:
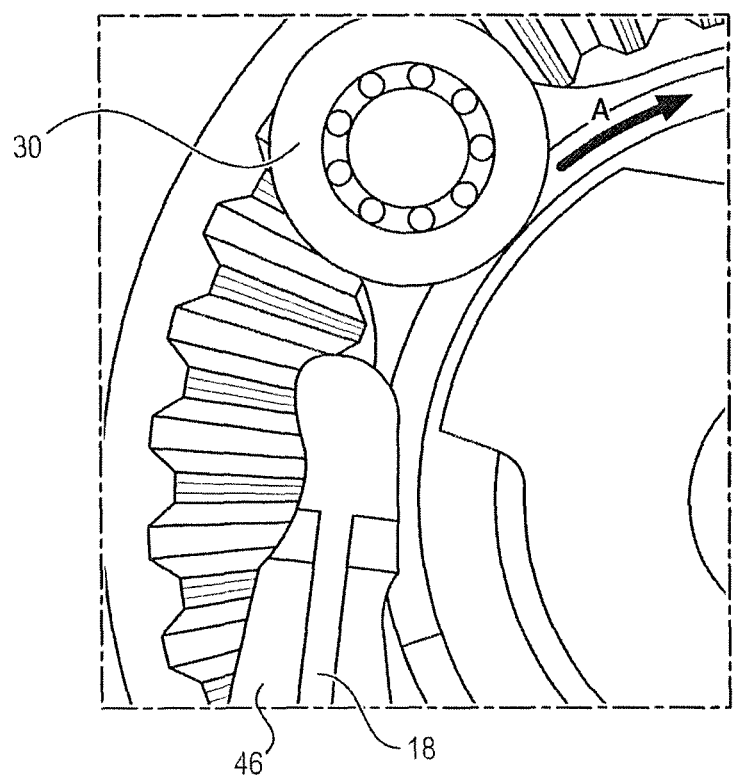
Figure 9C:
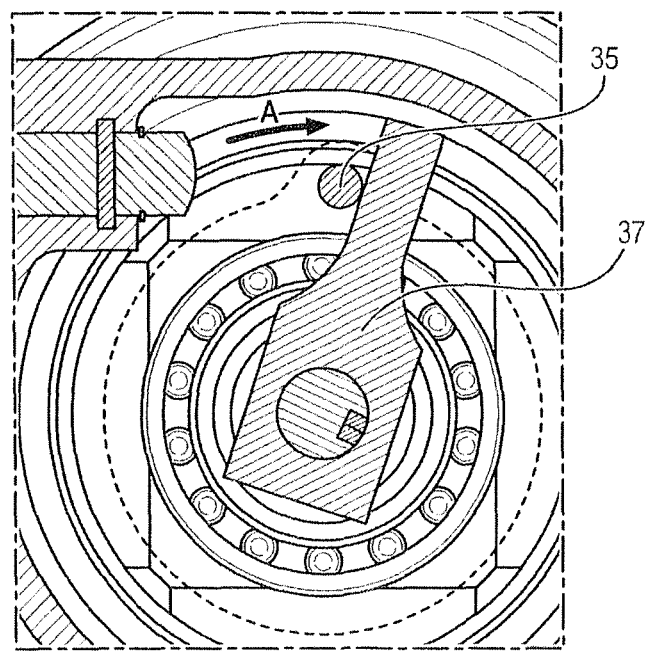
Figure 10B:
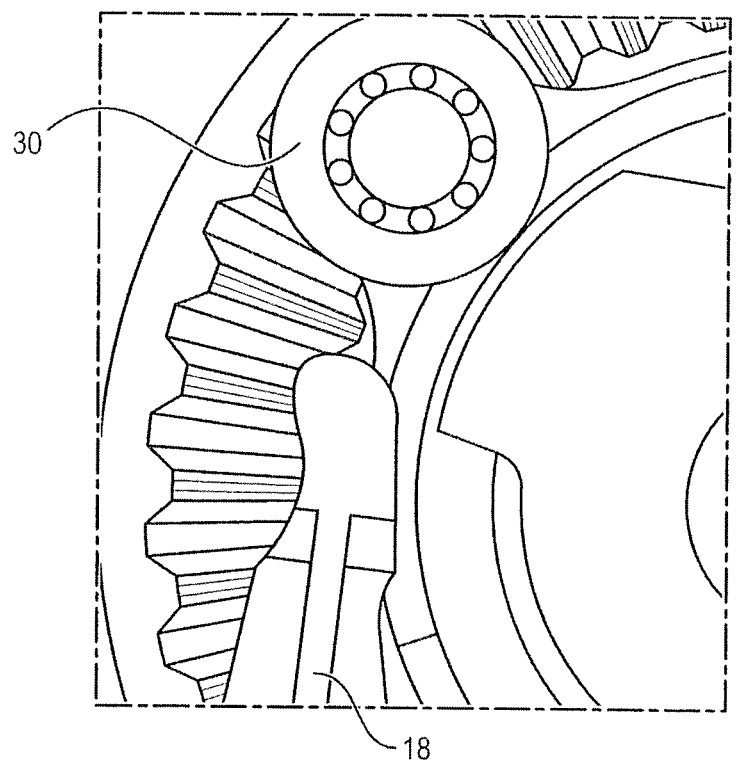
Figure 10C:
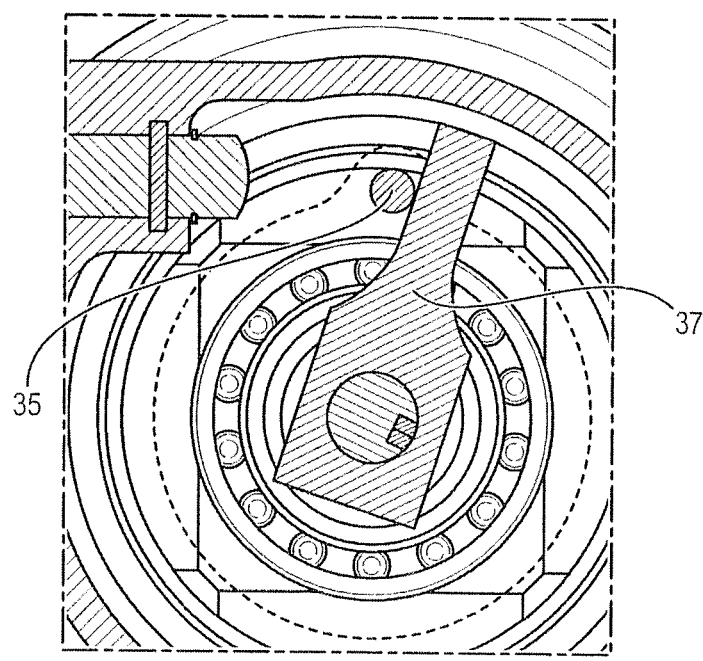

When the pilot commands the deployment of the thrust reverser, a control system triggers power supply to the electromagnet 31 (FIG. 7A). The electromagnet 31 then applies a torque to the unlocking piece 25, which has the effect of causing the unlocking piece 25 to rotate about the X axis, in the first direction indicated by arrow A (FIGS. 7B and 7C).

Rotation of the unlocking piece 25 has the effect, initially, of disengaging the roller 30 from the pawl 46 (FIG. 9B) and simultaneously causing the finger 37 to pivot.

While the unlocking piece 25 is driven in rotation by the electromagnet 31 (FIG. 8A), the pin 29, in a second step, drives the pawl 46 (FIG. 8B) to separate the pawl 46 from the tooth 21. More precisely, the pin 29 drives the pawl 46 once the roller 30 is no longer in contact with the pawl 46. Moreover, the finger 37 pivots (FIG. 8C) and passes beyond the stop 35.

Once the pawl 46 is in the unlocked position (FIGS. 9A and 9B), the actuating device 1 can be deployed. In fact, the pawl 46 allows rotation of the screw 3. The screw 3 is driven in rotation such that the nut 4 translates along the screw 3 in the X direction while moving away from the first extreme position. In moving away from the first extreme position, the nut 4 ceases to drive the mobile rod 40 and consequently the retainer 34. The retainer 34 is moved in translation along the X axis in the second direction D under the influence of the return spring 41. This has the effect that the finger 37 positions itself behind the stop 35 (FIGS. 9A and 9C), the stop preventing rotation of the retainer 34 (and consequently of the unlocking piece 25) in the second direction (arrow B).

From this moment on, the electromagnet 31 can be deactivated, with the pawl 46 returning to the locked position. Indeed, the retainer 34 holds the unlocking piece 25 in the active position, that is a position wherein the unlocking piece 25 holds the pawl 46 in the unlocked position.

This has as a consequence that the actuating device 1 cannot be locked so long as the nut 4 has not returned to the first extreme position, that is as long as the actuating device has not returned to the retracted configuration.

When the thrust reverser is retracted, the screw 3 is driven in rotation such that the nut 4 translates along the screw 3 in the X direction toward the first extreme position. When approaching the first extreme position, the nut 4 drives the mobile rod 40 and consequently the retainer 34. The retainer 34 is moved in translation along the X axis in the first direction C (FIG. 10A) under the influence of the thrust of the rod 40. This has the effect of moving the finger 37 out of reach of the stop 35.

Figure 11B:
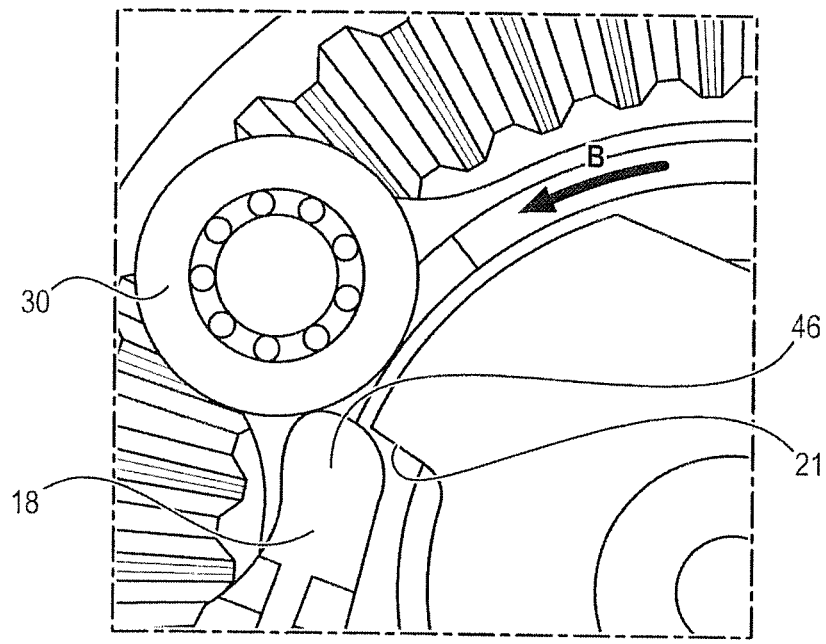
Figure 11C:
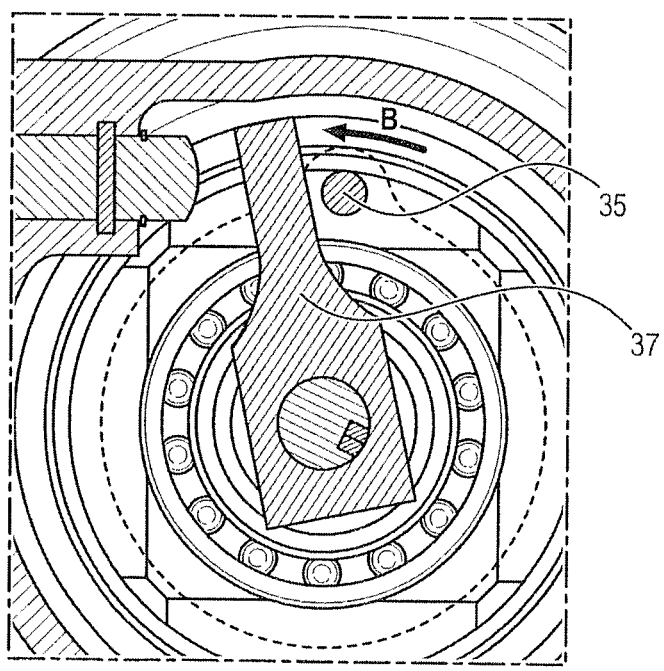
Figure 12A:
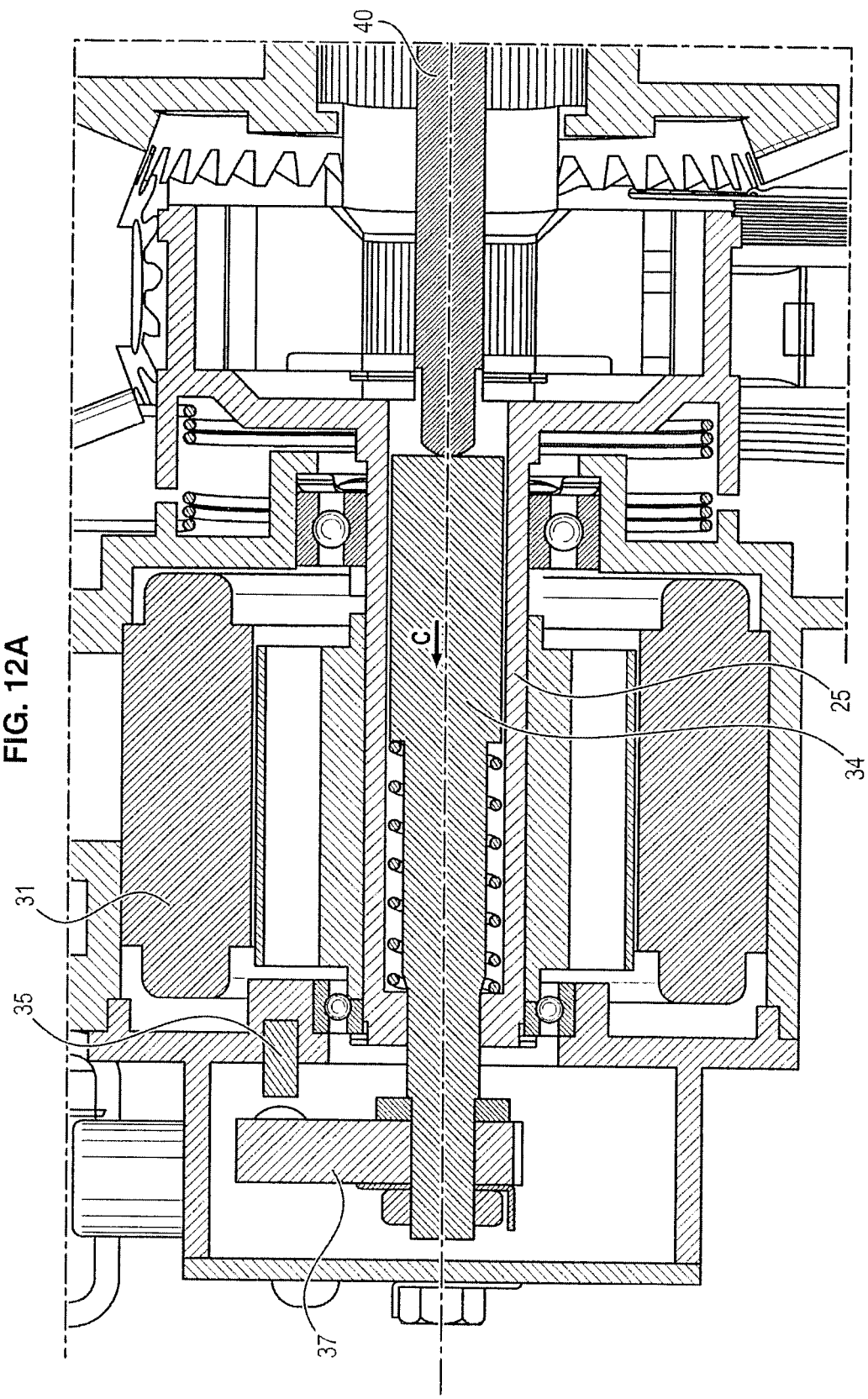
Figure 12B:
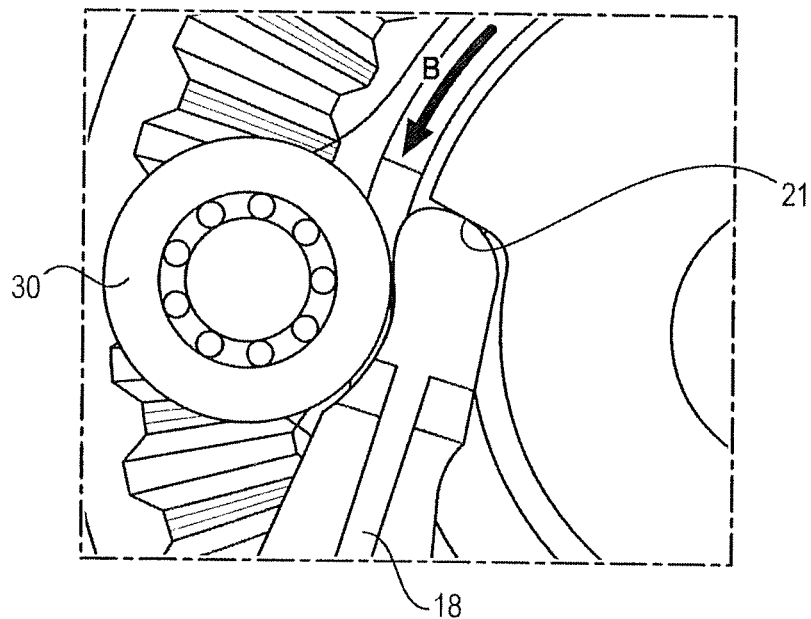
Figure 12C:
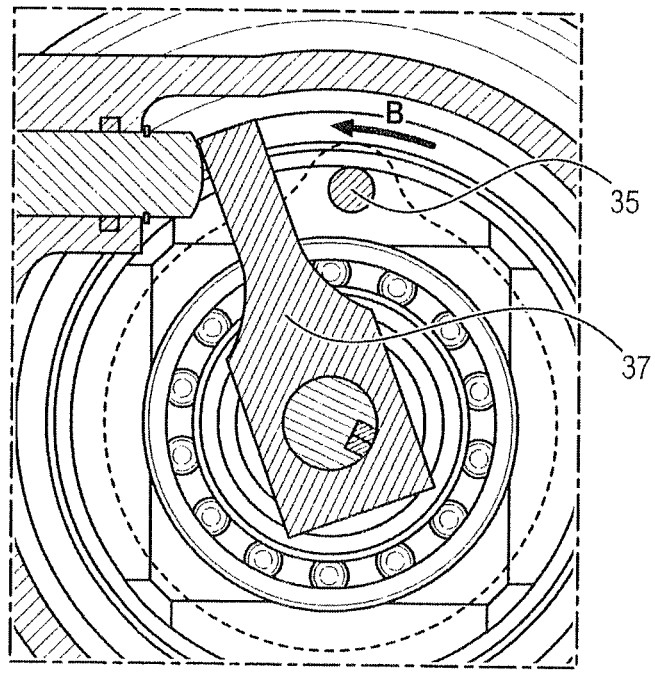

Once the finger 37 is out of reach of the stop 35 (FIGS. 11A and 9C), the stop 35 no longer prevents rotation of the retainer 34 (and consequently of the unlocking piece 25). The retainer 34 (and consequently the unlocking piece 25) is driven in rotation in the second direction (arrow B) under the influence of the return spring 32 (FIG. 11B). The unlocking piece 25 releases the pawl 46 which pivots into the locked position under the influence of the return spring 22.

Rotation of the unlocking piece 25 also has the effect of returning the roller 30 into contact with the pawl 46 (FIG. 12B) and of simultaneously causing the finger 37 to pivot. The free end of the pawl 46 comes into abutment against the tooth 21 and the roller 30 supports the pawl 46 to hold the pawl 46 in engagement with the tooth 21.

Thus, complete retraction of the actuating device brings about an automatic return of the locking device into the locked position. Once the locking device is in the locked position, the locking device can no longer be unlocked unless the pilot again commands the deployment of the thrust reverser, which triggers activation of the electromagnet.

FIG. 13 shows schematically an actuating device 1 conforming to a second embodiment of the invention.

The actuating device 1 according to the second embodiment is identical to the device of the first embodiment, with the exception of the fact that the locking piece 18 is a cylindrical latch 47 mounted in rotation relative to the housing 2 about an axis X' parallel to the X axis.

The cylindrical latch 47 includes, on the one hand, locking portion 48, and on the other hand a drive portion 49.

As illustrated in FIGS. 16A and 16B, the locking portion 48 exhibits a half-moon shape. More precisely, the locking portion 48 includes a convex portion 50 for engagement and a concave (or substantially flat) portion 51 for disengagement, capable of being selectively positioned facing the tooth 21 when the latch 47 is driven in rotation.

When the latch 47 is in the unlocked position (FIG. 14A), the concave portion 51 is positioned facing the tooth 21 so as to allow rotation of the second locking piece 19 (and consequently of the screw). When the latch 47 is in the locked position (FIG. 14B), the convex portion 50 is positioned facing the tooth 21 so as to interfere with the tooth 21 and thus prevent rotation of the screw 3.

As illustrated in FIGS. 15A and 15B, the drive portion 49 includes a toothed sector 52. The unlocking piece 25 also includes a toothed sector 53 arranged so as to mesh with the toothed sector 52 of the latch 47. Thus, rotation of the latch 47 is controlled by rotation of the unlocking piece 25.

Rotation of the unlocking piece 25 in the first direction of rotation (arrow A) has the consequence of causing the latch 47 to pivot into the unlocked position (illustrated in FIG. 15B).

Conversely, rotation of the unlocking piece 25 in the second direction (arrow B), opposite to the first direction, has the effect of causing the latch 47 to pivot into the locked position (illustrated in FIG. 15A).

The operation of the actuating device 1 according to the second embodiment is identical to the operation of the actuating device 1 according to the first embodiment.

The invention claimed is:

1. An actuating device (1) for moving a movable cover of a thrust reverser, comprising:
   an actuator including a first element (3) and a second element (4) mounted movable in translation relative to the first element, one of the first element and the second element being a screw, and the other being a nut cooperating with the screw, such that rotation of the first element (3) relative to the second element (4) brings about translation of the second element (4) relative to the first element (3),
   a locking device (17) including a rotatable locking piece (18) which rotates between a locked position, wherein the locking piece (18) in said locked position prevents rotation of the first element (3), and an unlocked position, wherein the locking piece (18) in said unlocked position allows rotation of the first element (3), and an unlocking device (23) including an unlocking piece (25) movable in rotation between an active position wherein the unlocking piece (25) urges the locking piece (18) toward the unlocked position and a passive position wherein the unlocking piece (25) allows the locking piece (18) to return to the locked position, and a drive member (24) capable of driving the unlocking piece (25) in rotation in order for the unlocking piece (25) to move the locking piece (18) toward the unlocked position.

2. The device according to claim 1, wherein the locking device (17) includes a tooth (20, 21) mounted so as to rotate together with the first element (3), the locking piece (18), in the locked position, engaging with the tooth (20, 21) to prevent rotation of the first element (3).

3. The device according to claim 2, wherein the locking piece (18) includes a pawl (46) which engage with the tooth (20, 21) in the locked position.

4. The device according to claim 3, wherein the locking device (17) includes a roller (30) carried by the unlocking piece (25), which holds the pawl (46) in engagement with the tooth (20, 21) when the pawl (46) is in the locked position.

5. The device according to claim 3, wherein the unlocking piece (25) includes a pin (29) which, when the unlocking piece (25) is driven in rotation, urges the pawl (46) to cause the pawl (46) to pivot into the unlocked position.

6. The device according to claim 2, wherein the locking piece (18) includes a latch (47) having a convex portion (50) and a concave portion (51) which is selectively positioned facing the tooth (20, 21), the convex portion (50) interfering with the tooth (20, 21) when the convex portion (50) is facing the tooth (20, 21) to prevent rotation of the first element (3), and the concave portion (51) allowing rotation of the first element (3) when the concave portion (51) is facing the tooth (20, 21).

7. The device according to claim 2, wherein the tooth (20, 21) is asymmetrical so that, in the locked position, the locking piece (25) prevents rotation of the first element (3) in a first direction (A) and allows rotation of the first element (3) in a second direction (B), opposite to the first direction.

8. The device according to claim 1, wherein the locking piece (18) meshes with the unlocking piece (25) so that rotation of the unlocking piece (25) controls rotation of the locking piece (18).

9. The device according to claim 1, wherein the drive member (24) includes a rotating electromagnet (31).

10. The device according to claim 1, wherein the unlocking device (23) includes a return spring (32) which urges the unlocking piece (25) into the passive position.

11. The device according to claim 1, wherein the unlocking device (23) includes a stop (35) and a retainer (34) rotationally fixed to the unlocking piece (25) and movable in translation relative to the unlocking piece (25) between a retaining position wherein rotation of the retainer (34) is limited by the stop (35) and a release position wherein the retainer (34) is free in rotation.

12. The device according to claim 11, comprising a return member (41) for urging the retainer (34) into the retaining position.

13. The device according to claim 11, comprising a rod (40) movable in translation relative to the first element (3) and when urged by the second element (4) moves the retainer (34) into the release position.

14. The device according to claim 13, wherein the mobile rod (40) extends at least partially inside the first element (3).

15. The device according to claim 11, further including a manual unlocking device (54) for driving the retainer (34) in rotation so as to bring the unlocking piece (25) into the active position without activating the drive member (24).

16. The device according to claim 1, wherein the first element (3) is the screw and the second element (4) is the nut.

* * * * *